United States Patent [19]
Takamizawa et al.

[11] Patent Number: 5,102,115
[45] Date of Patent: Apr. 7, 1992

[54] IMAGE READING DEVICE

[75] Inventors: Shiro Takamizawa, Saku; Toshihiro Kumano, Chiisagata; Yuji Ishii, Chiisagata; Kiroyuki Yamada, Chiisagata; Masanori Sato, Chiisagata, all of Japan

[73] Assignee: Matsushita Graphic Communication Systems, Inc., Tokyo, Japan

[21] Appl. No.: 626,301

[22] Filed: Dec. 12, 1990

[51] Int. Cl.⁵ .............................................. B65H 3/52
[52] U.S. Cl. ................................... 271/121; 271/124; 271/167
[58] Field of Search ............... 271/121, 124, 165, 167, 271/113

[56] References Cited

U.S. PATENT DOCUMENTS

| | | | |
|---|---|---|---|
| 4,306,713 | 12/1981 | Avritt et al. | 271/165 X |
| 4,674,737 | 6/1987 | Murayoshi | 271/124 |
| 5,004,217 | 4/1991 | Kano et al. | 271/121 X |

FOREIGN PATENT DOCUMENTS

| | | | |
|---|---|---|---|
| 63-57446 | 3/1988 | Japan | 271/121 |
| 63-272728 | 11/1988 | Japan | 271/121 |
| 2178135 | 12/1988 | Japan | 271/121 |

*Primary Examiner*—David H. Bollinger
*Attorney, Agent, or Firm*—Wenderoth, Lind & Ponack

[57] ABSTRACT

An image reading device having a feed roller and a document-separating member for separating and feeding one document at a time from a stack of documents on a hopper, and an image sensor for reading each document being transported through a suitable document transport path inside the device. The document transport path is inclined downward for a short distance immediately downstream of the feed roller and the document-separating member, then is bent in a near-horizontal direction, stretching substantially straight. This structure reduces the overall height of the device. A rotatable pushing member for pushing the document-separating member against the feed roller has a document guide surface which is located downstream of the document-separating member and which protrudes beyond the putative extension of the document contact plane at the end of the document-separating member, the pushing member thereby constituting a bend of the path. Because the document guide surface supports a document being fed while bending along the path, the document does not hit and raise the document-separating member to disrupt its document-separating action.

14 Claims, 8 Drawing Sheets

IMAGE READING DEVICE

BACKGROUND OF THE INVENTION

1. Field of the Invention

The present invention relates to a device with capabilities for reading images such as an image communication device or a copier (generically called the image reading device) and, more particularly, to an image reading device that reads images from a document while internally transporting the document.

2. Description of the Prior Art

A typical prior art image communication device has on its top a hopper on which to place a stack of documents. Below the hopper are a feed roller and a document-separating member for separating and feeding one document at a time from the stack of documents. Below the feed roller and the document-separating member are an image sensor for reading each document being transported and a document ejection roller for ejecting each document that has been read, the finished document being ejected under the device. With this type of device, bending the document transport path abruptly toward the document-separating member immediately downstream of the feed roller and the document-separating member would cause the document being fed to interfere with the document-separating member and result in a feed error. The bending of the document transport path must not be acute to avoid the interference. Ordinarily, the path is substantially straight between the feed roller and the document ejection roller, and has an angle of about 60 degrees to the horizontal.

Because the document transport path in the transmitting section of the device, particularly the path downstream of the feed roller, has a large angle (about 60 degrees) relative to the horizontal, the path as a whole is necessarily which, means the device itself becomes tall. One disadvantage of this prior art construction is that the part mounting efficiency in the device is decreased due to the device being tall.

BRIEF SUMMARY OF THE INVENTION

It is therefore an object of the present invention to provide an image reading device such as an image communication device which is low in overall height due to its document transport path being reduced in elevation.

It is another object of the present invention to provide an image reading device in which the document transport path is bent so as to reduce the overall height of the device without disrupting the document-separating action performed by the feed roller and document-separating member.

It is a further object of the present invention to provide an image reading device in which the document transport path is bent so as to reduce the overall height of the device without the need to increase the number of parts constituting the device.

According to one aspect of the invention, there is provided an image reading device in which a pushing member for pushing the document-separating member against the feed roller has a document guide surface which is located downstream of the document-separating member and which protrudes beyond the putative extension of the document contact plane at the end of the document-separating member. Because the document guide surface supports the document, the document does not act to separate the document-separating member from the feed roller. Thus documents are separated smoothly and one at a time from the stack of documents. Downstream of the document guide surface formed by the pushing member, the document transport path is bent so as to be located above the putative extension of the document transport path upstream of the document guide surface, and then extends substantially straight. This structure reduces the elevation of the document transport path as a whole. The document guide surface guides each document as it is transported while being bent. Instead of the document guide surface, the pushing member may have an alternative guide means for guiding each document as it is transported while being bent.

In a preferred embodiment of the invention, the pushing member is rotatably mounted around a rotation center located on a bisector of the angle formed by the document transport path before and after the document guide surface. This setup minimizes the fluctuation that may occur in the pressure of the pushing member against the document-separating member because the pressure of each document that passes the document guide surface does not exert a torque on the pushing member.

There is preferably provided a document guide surface concaved upward below the bend of the document transport path so that the tip of each document is smoothly guided along the surface.

Furthermore, there is preferably provided the above-mentioned pushing member being retained by a support member having a surface for guiding the topside of each document being fed from the hopper, the support member being rotatably attached to a rotary fulcrum shaft on an approximate extension of the document transport path from the hopper. Because of this construction, if the support member is pushed by the tips of documents set in the hopper, the pushing force at that time is directed to the rotary fulcrum shaft of the support member and does not rotate the member. Thus no feed error results from the change that would conventionally occur in the pressure of the document-separating member against the feed roller.

The above and other related objects and features of the invention will be apparent from the following description and from the accompanying drawings.

DETAILED DESCRIPTION OF PREFERRED EMBODIMENTS

Figure 8:
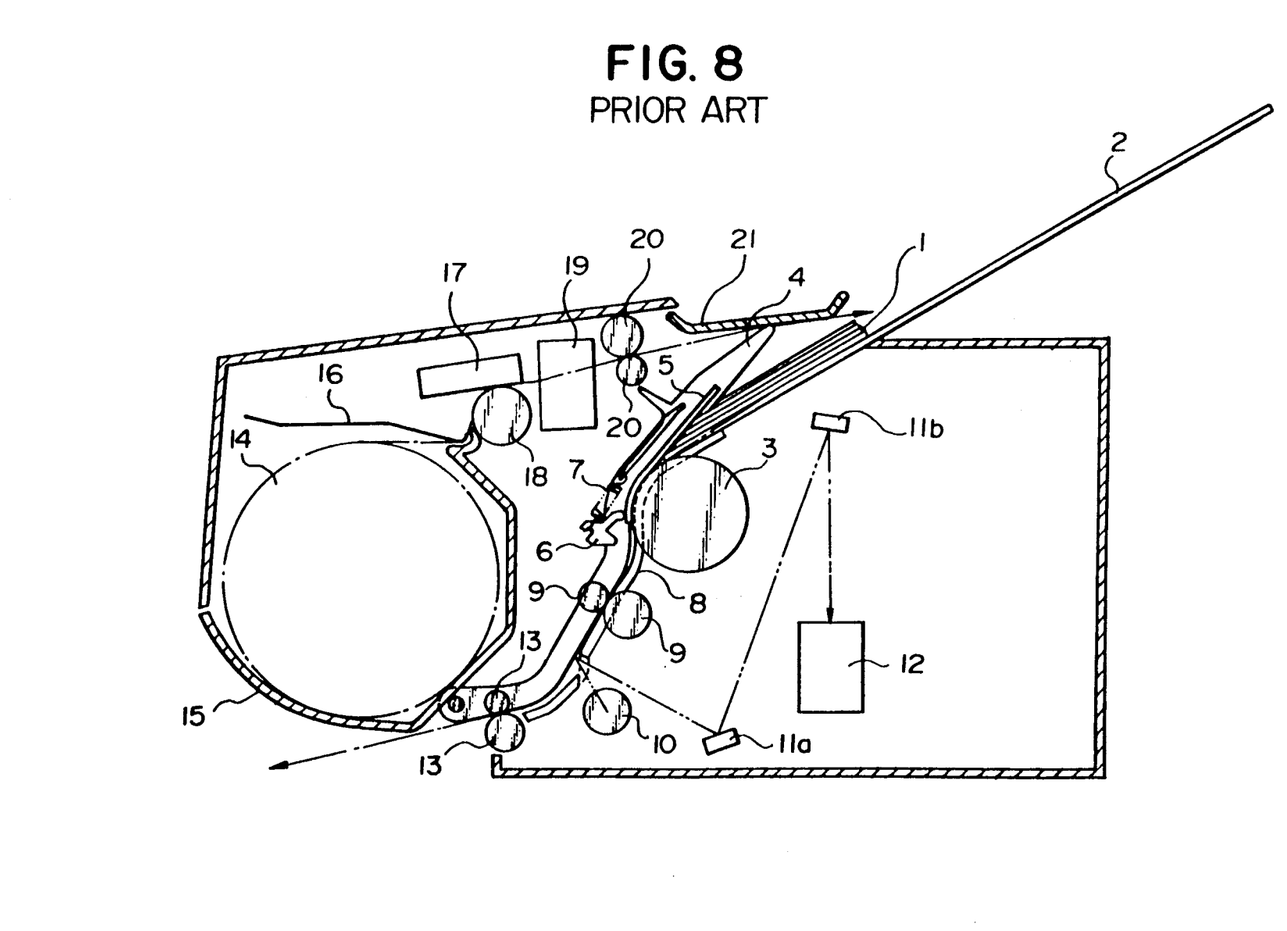
FIG. 8 is a sectional view of a typical prior art image communication device.

Prior to describing the preferred embodiment of the invention, a typical prior art image communication device will be described with reference to FIG. 8. As depicted, the device has a transmitting section comprising a hopper 2 for holding a stack of documents 1, a feed roller 3 for feeding the documents 1, a transmitting guide plate 4 for guiding the topside of each document, a document-separating member 5 made of rubber or the like, a pushing member 6 for pushing the document-separating member 5, a pushing spring 7 for exerting pressure onto the pushing member 6, a feed guide plate 8, a reading roller 9 for transporting each separated document, a lamp 10 for lighting the face of each document, mirrors 11a and 11b for transmitting the reflected light, an image sensor 12 for converting the reflected light into electrical signals, and a document ejection roller 13 for ejecting documents that were read. Immediately downstream of the feed roller 3 and document-separating member 5 of this device, the document transport path must not be abruptly bent toward the document-separating member 5, or the document being transported will interfere with the member 5 and can result in feed error. Ordinarily, the document transport path between feed roller 3 and document ejection roller 13 is substantially straight and has an angle of 60 degrees or thereabout relative to the horizontal, as illustrated.

The prior art image communication device also has a receiving section comprising a recording paper box 15 for holding recording paper 14, a guide 16, a recording head 17, a platen roller 18 positioned opposite to the recording head 17, a cutter 19 for cutting sheets off the recording paper 14, a recording paper ejection roller 20 for ejecting each cut sheet of the recording paper 14, and a stack guide for stacking cut sheets of the recording paper 14. The recording paper transport path between platen roller 18 and recording paper ejection roller 20 has an angle of 10 degrees or thereabout relative to the horizontal.

One disadvantage of the above-described prior art is that because the document transport path in the transmitting section of the device is inclined at about 60 degrees to the horizontal, the overall height of the device needs to be increased accordingly.

Figure 1:
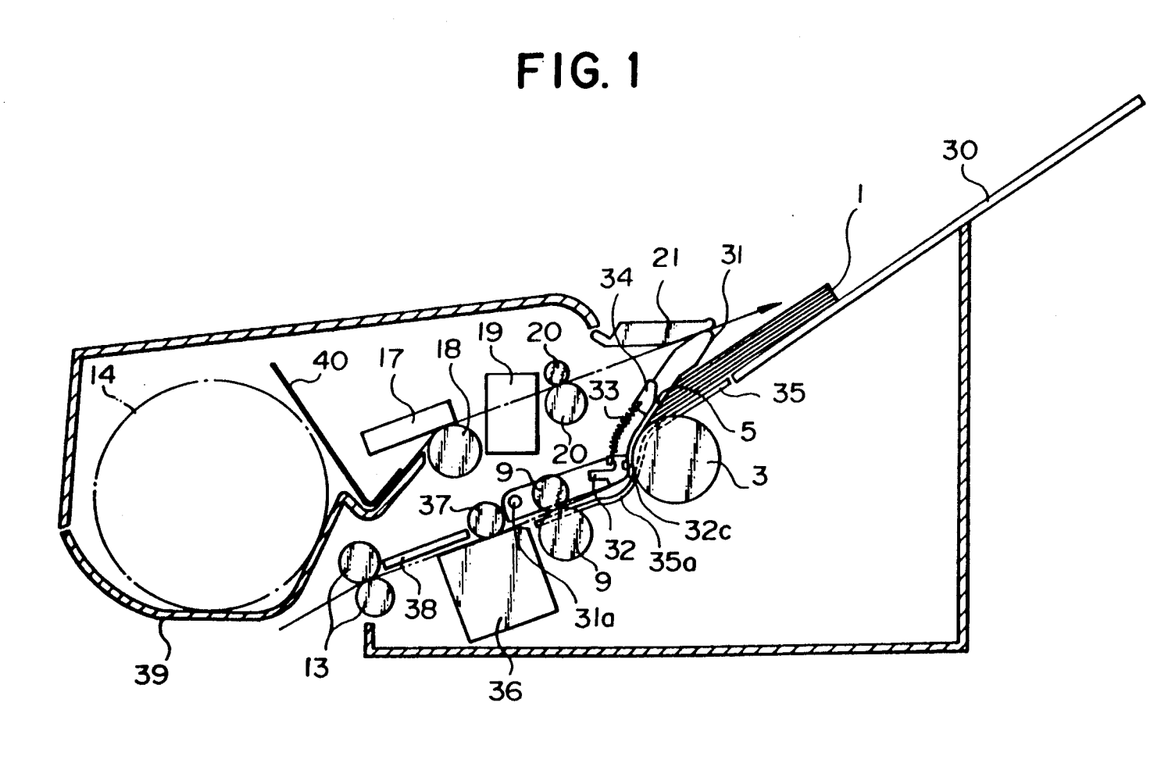
FIG. 1 is a schematic sectional view of an image reading device as a preferred embodiment of the present invention.
Figure 2:
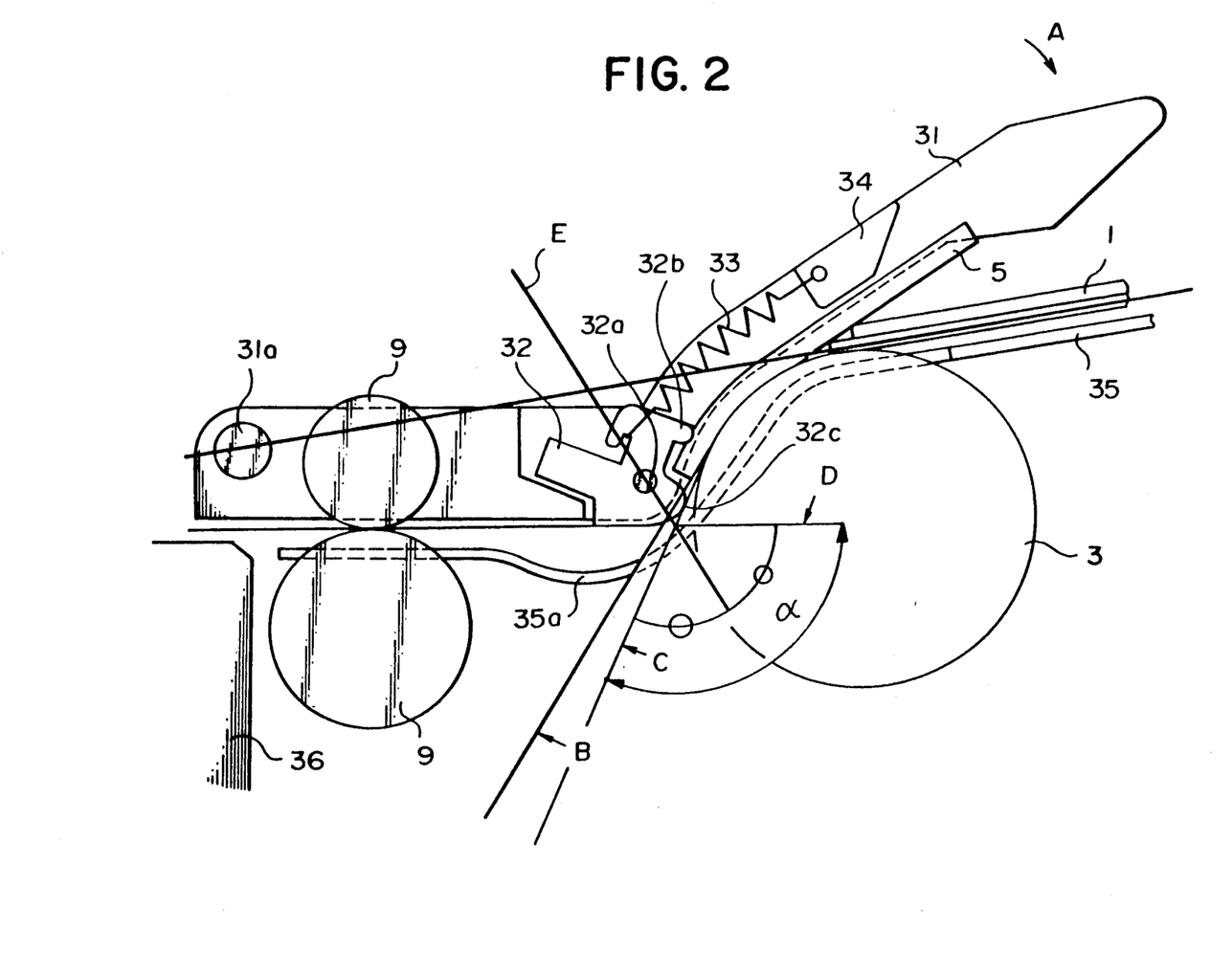
FIG. 2 is a sectional view of the major parts of the preferred embodiment.

This and other disadvantages of the prior art are circumvented by the preferred embodiment of the invention, a sectional view thereof being shown in FIG. 1. The major parts of the transmitting section in the embodiment are depicted in FIG. 2. It is to be noted that in FIGS. 1 and 2, as well as in FIG. 8, like reference characters designate like or corresponding parts. Referring to FIGS. 1 and 2, the embodiment has on its top a hopper 30 for holding a stack of documents 1. The hopper 30 is inclined at about 35 degrees to the horizontal to encourage the introduction of documents into the device. At the lower end of the hopper 30 are a feed guide plate 35 for guiding the bottom side of documents 1 and the feed roller 3 for feeding each document. Above the feed guide plate 35 and the feed roller 3 are the document-separating member 5 pushed against the feed roller 3 and a support member 31 for retaining the document-separating member 5. The support member 31 has a guide surface, over which the topside of each document being fed crosswise and lengthwise from the hopper 30 is guided up to the reading roller 9. The support member 31 will be hereafter called the transmitting guide plate. The transmitting guide plate 31 is rotatably attached to a rotary fulcrum shaft 31a. In normal operation, the transmitting guide plate 31 is actuated by a spring, not shown, in the arrowed direction A and pushed as illustrated against a stopper, not shown. In case of jamming or other feed disruption, the transmitting guide plate 31 is rotated upwardly away from the feed roller 3 for inspection. The rotary fulcrum shaft 31a is located on the approximate putative extension of the document transport surface of the hopper 30. This construction prevents the transmitting guide plate 31 from rotating even if the plate 31 is pushed by the tips of documents placed on the hopper 30.

Figure 3:
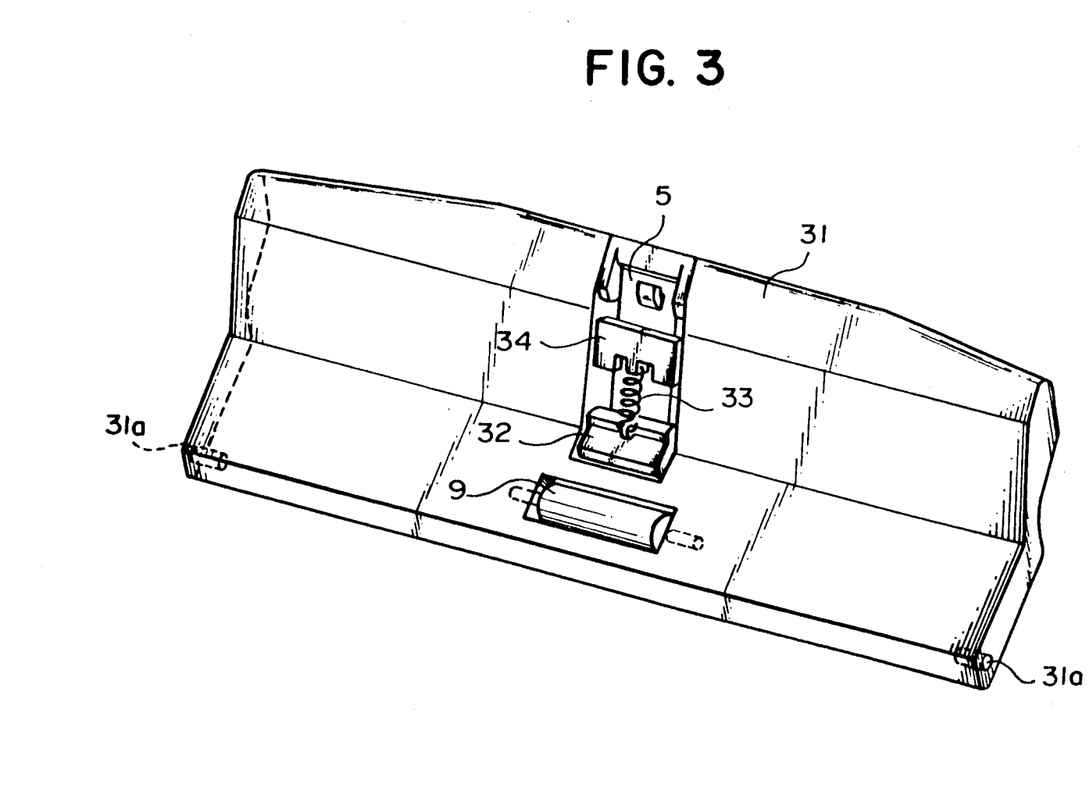
FIG. 3 is a perspective view of the major parts of the preferred embodiment.

The transmitting guide plate 31 has a pushing member 32 to a rotary fulcrum shaft 32a, the pushing member 32 pushing the document-separating member 5 against the feed roller 3. The pushing member 32 is connected to one end of a pushing spring 33 that presses the pushing member 32 against the document-separating member 5. The other end of the pushing spring 33 is connected to an adjusting member 34 attached to the transmitting guide plate 31. The adjusting member 34 is used to adjust the tension of the pushing spring 33. Specifically, the adjusting member 34, retained by the transmitting guide plate 31 in a vertically sliding manner, is capable of adjusting the tension of the pushing spring 33 in a plurality of steps. The parts 31, 32, 33 and 34 constitute the assembly shown in the section view of FIG. 3.

Referring to FIG. 2, the pushing member 32 comprises a pushing part 32b for pushing the back of the document-separating member 5 and a document guide surface 32c located downstream of the member 5. The document guide surface 32c protrudes beyond an extension B of the document contact surface (or document feed plane) at the end of the document-separating member 5. The reading roller 9, located downstream of the document guide surface 32c, is above the document transport path from the feed roller 3 and document-separating member 5 to the document guide surface 32c, i.e., above an extension C of the upstream document transport path. Thus the document transport path downstream of the document guide surface 32c is inclined at an angle α to the upstream document transport path. In other words, the document transport path down from the feed roller 3 and document-separating member 5 is bent at the document guide surface 32c toward the pushing member 32 to approach the horizontal, the surface 32c being downstream of the document-separating member 5. The upstream document guide path from the feed roller 3 and document-separating member 5 to the document guide surface 32c is inclined at about 65 degrees to the horizontal, while the downstream document transport path between document guide surface 32c and reading roller 9 is inclined at about 20 degrees to the horizontal in order to reduce the overall height of the device. It follows that the angle formed by the downstream and upstream document transport paths, i.e., the angle made by extensions C and D of the respective paths, is about 135 degrees. The rotary fulcrum shaft 32a of the pushing member 32 is located on a bisector E of the angle formed by the document transport path that bends before and after the document guide surface 32c. With this arrangement, when a document passes as it bends over the document guide surface 32c, the tension of the document applied to the surface 32c is in fact directed to the rotary fulcrum shaft 32a. That is, one benefit of this arrangement is that the pushing member 32 is not torqued by passing documents, with the result that no change takes place in the pressure against the document-separating member 5. Because the document guide surface 32c protrudes beyond the extension B of the document contact surface at the end of the document-separating member 5, the member 5 is not pushed upward by documents. With the pressure against the document-separating member 5 held constant, the mechanical area in which documents are separated one at a time is not reduced. In this embodiment, the document guide surface 32c is provided on the pushing member 32. Alternatively, a dedicated guide means with a document guide surface may be provided apart from the pushing member. However, the embodiment as illustrated has an advantage of fewer parts to be incorporated in the device.

The feed guide plate 35 has a document guide surface 35a concaved upward under the document guide surface 32c, i.e., under an inflection point connecting the upstream and downstream document transport paths.

Referring again to FIG. 1, downstream of the reading roller 9 are a contact-type image sensor unit 36 for reading data from each document, a reading roller 37 for transporting each document while letting it contact the image sensor unit 36, an ejection guide 38, and the document ejection roller 13. The document transport path made up of these parts is located on an approximate extension of the transport path between document guide surface 32c and reading roller 9. Thus the document transport path between document guide surface 32c and document ejection roller 13 is substantially straight and is inclined at about 20 degrees to the horizontal. As described, the document transport path between hopper 30 and document ejection roller 13 is bent to approach the horizontal at the document guide surface 32c located immediately downstream of the document-separating member 5. This construction allows the overall height of the document transport path to be lower than that of the prior art device shown in FIG. 8. The lower path height translate into an advantage of a reduced overall height of the device.

The embodiment also has a receiving section comprising a recording paper box 39 for holding recording paper 14, a guide 40, a recording head 17 for printing onto the recording paper 14, a platen roller 18 positioned opposite to the recording head 17, a cutter 19 for cutting sheets off the recording paper 14, a recording paper ejection roller 20, and a stack guide 21 through which cut sheets of the recording paper 14 are stacked. The receiving section is located above the transmitting section of the device. The recording paper transport path between platen roller 18 and recording paper ejection roller 20 is inclined at about 20 degrees to the horizontal, running substantially parallel to the document transport path downstream of the document-separating member 5.

Figure 4:
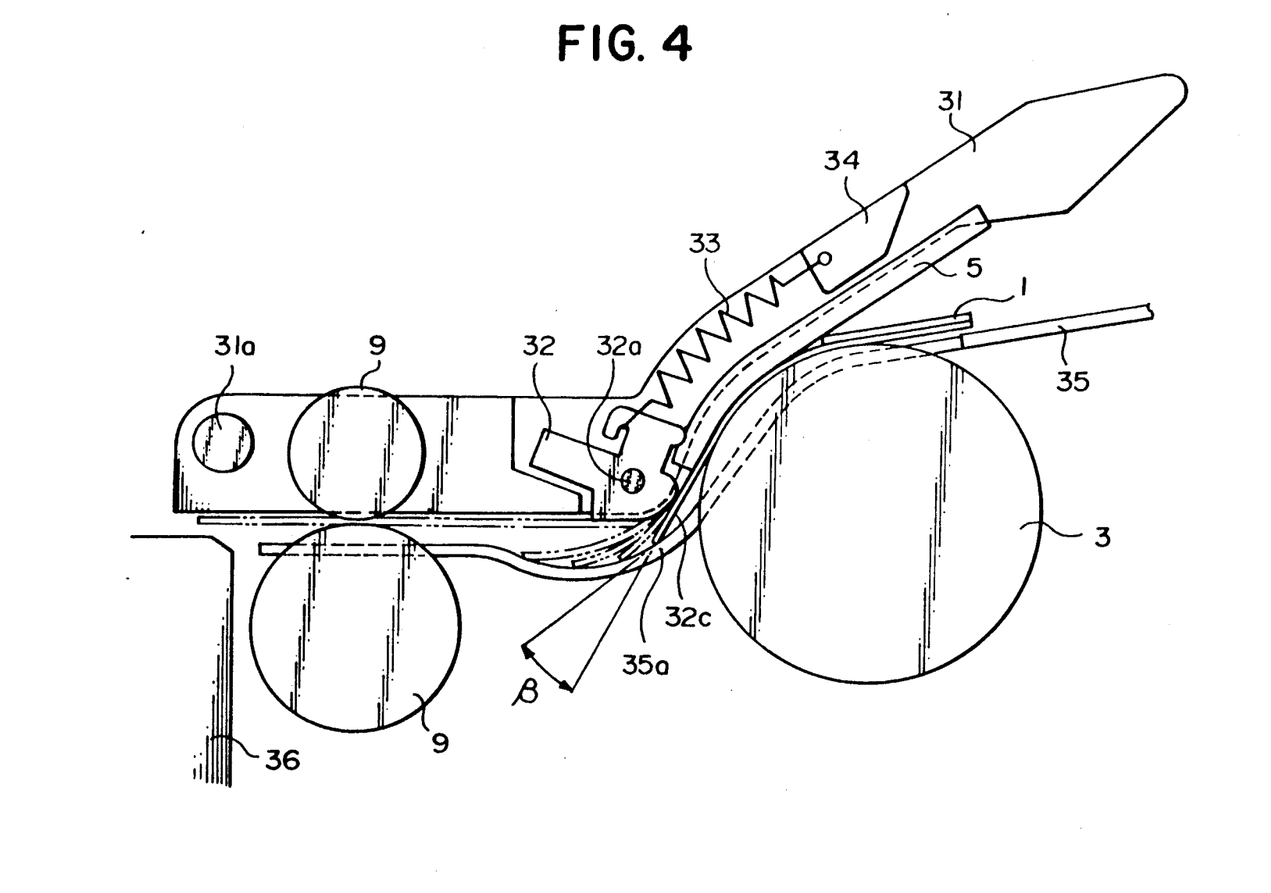
FIG. 4 is a sectional view showing how the major parts operate.

Below is a description of how the documents 1 are transported through the transmitting section of the embodiment. Referring to FIG. 4, the documents 1 set in the hopper and against the feed guide plate 35 are driven by the feed roller 3 and come in contact with the document-separating member 5. There, the documents are separated one by one, each forwarded to the curved document guide surface 35a of the feed guide plate 35. The tip of each document 1 enters the document guide surface 35a at a small incidence angle $\beta$ and is guided thereby for advance. At this point, the curvature of the document guide surface 35a is preferably set so that the angle between document 1 and document guide surface 35a is kept to within 30 degrees while the document is being transported. This setup prevents jamming of documents and other feed disruption.

Figure 5:
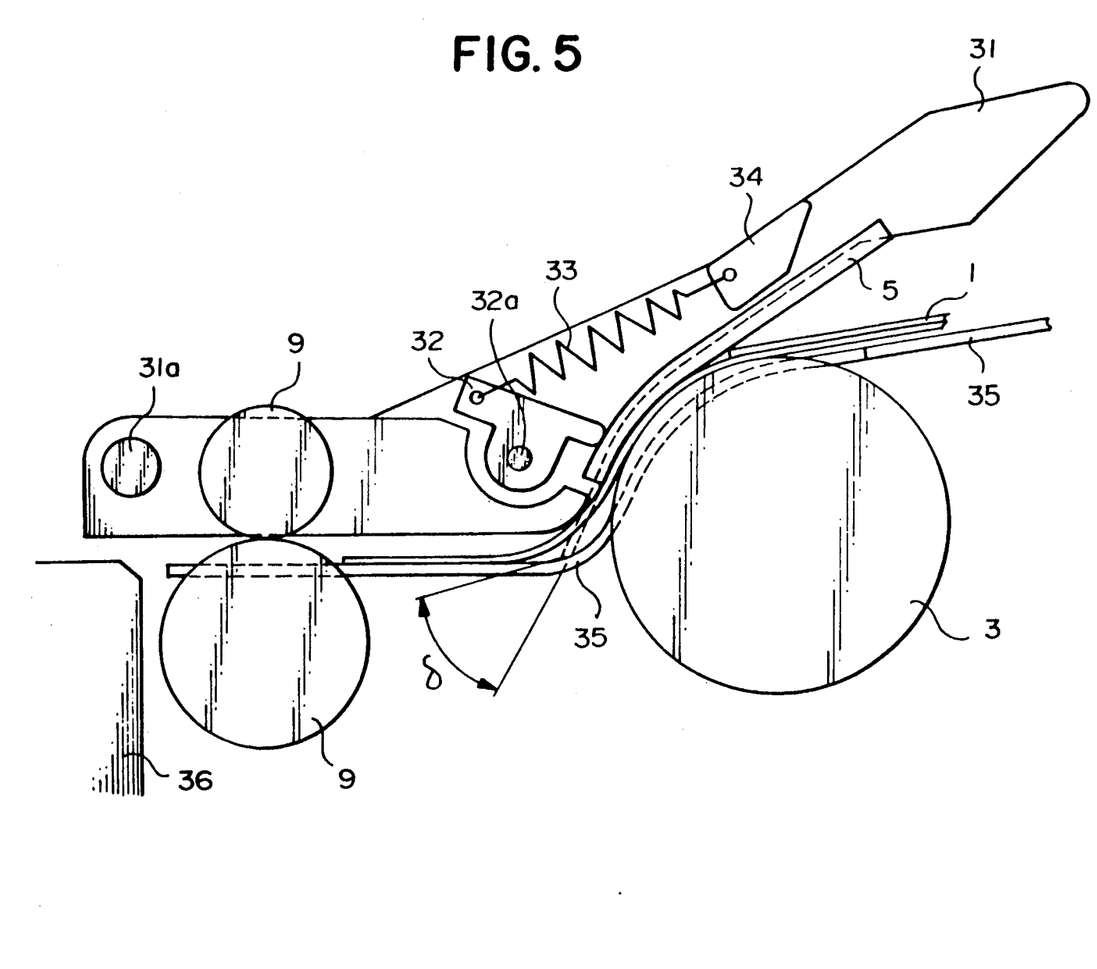
FIG. 5 is a sectional view of the major parts as they operate when a curved document guide surface is not provided on a feed guide plate.

If the curved document guide surface 35a is not provided, as in conventional setups, on the feed guide plate 35, the feed guide plate 35 is shaped as depicted in FIG. 5. In this case, each document 1 proceeds at an incidence angle $\delta$ of 45 degrees or more to the document guide plate 35. This can cause a document to get caught by the guide plate, resulting in jamming or other feed disruption.

Referring again to FIG. 4, the document 1 going past the document guide surface 35a is led and forwarded by the reading roller 9. At this point, in FIG. 2, the document transport speed achieved by the reading roller 9 is higher than that of the feed roller 3. Each document 1 is being held taut while being pushed against the document guide surface 32c of the pushing member 32. Therefore the pressure onto the pushing member 32 is directed in the direction of the bisector E (see FIG. 2) of the angle formed by the bent document transport path. Because the rotary fulcrum shaft 32a of the pushing member 32 is located on this bisector, no torque is directed at the pushing member 32. Thus no change occurs in the pressure exerted by the pushing member 32 onto the document-separating member 5. This allows the documents to be separated stably one by one. Because the document guide surface 32c of the pushing member 32 protrudes beyond the extension B of the document guide surface at the downstream end of the document-separating member 5, there is no possibility of the document-separating member 5 getting pushed up by any document 1 in so as to result fluctuations in the pushing force or in a reduction of the mechanical area for document separation. This feature also contributes to having the documents separated stably one by one.

How the transmitting guide plate 31 works will now be described by referring again to FIG. 2. The transmitting guide plate 31 is rotatably mounted on the rotary fulcrum shaft 31a so that any jammed document may be readily removed. When documents are set on the hopper 30, the documents are inserted between transmitting guide plate 31 and feed roller 3. At this point, the tips of the documents push the transmitting guide plate 31 in parallel with the hopper 30. But because the the rotary fulcrum shaft 31a is located on the approximate extension of the direction in which the documents are set on the hopper, the force for inserting the document does not rotate the transmitting guide plate 31 around the rotary fulcrum shaft 31a. Thus no trouble results from the transmitting guide plate 31 being inadvertently dislodged by documents.

Figure 6:
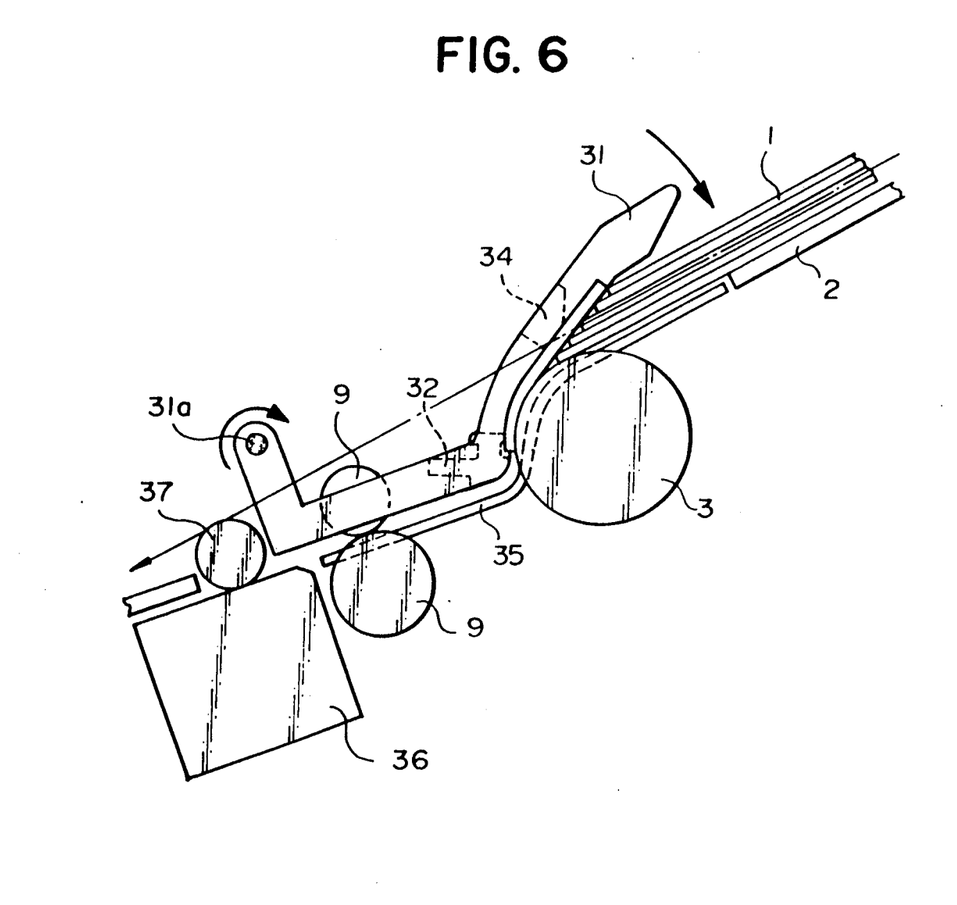
FIGS. 6 and 7 are sectional views of the major parts as they operate when the rotary fulcrum shaft of a transmitting guide plate is relocated.
Figure 7:
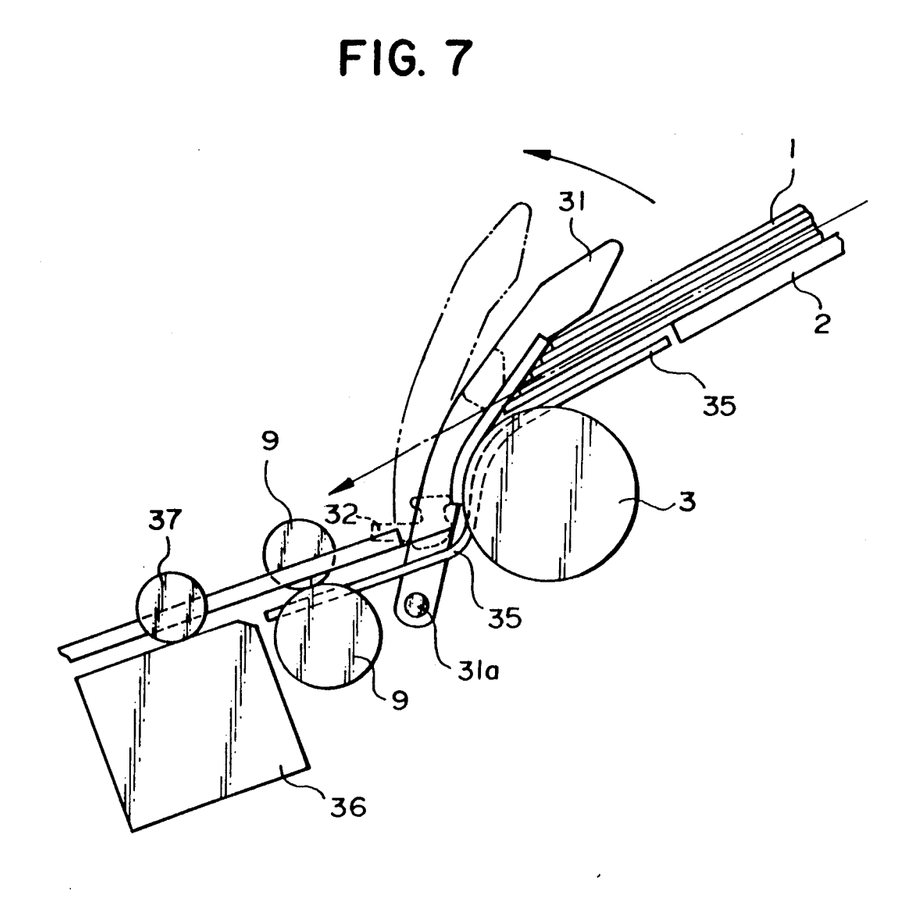

If, as shown in FIG. 6, the rotary fulcrum shaft 31a of the transmitting guide plate 31 is above the extension of the direction in which the documents 1 are inserted, the force from the inserted documents 1 produces a clockwise moment in the transmitting guide 31 around the rotary fulcrum shaft 31a. This allows the pressure to increase at the point where the feed roller 3 contacts the document-separating member 5, leading to faulty paper feed or to an excess wear on the document-separating member 5. If, as shown in FIG. 7, the rotary fulcrum shaft 31a of the transmitting guide plate 31 is located under the extension of the direction in which the documents 1 are inserted, the force for inserting the documents 1 generates a counterclockwise moment in the transmitting guide plate 31 around the rotary fulcrum shaft 31a, causing the plate 31 to move away from the feed roller 3. This can result in faulty separation of the documents. These problems are solved by the embodiment in which the rotary fulcrum shaft 31a of the transmitting guide plate 31 is suitably located where it is.

As described, the embodiment has its document transport path bent downstream of the feed roller and document-separating roller. This construction lowers the overall height of the device while ensuring stable feeding of documents through the device.

While the preferred embodiment of the invention has been described using specific terms, such description is for illustrative purposes only, and it is to be understood that changes and variations may be made without departing from the spirit or scope of the following claims.

What is claimed is:

1. An image reading device, comprising:
   a feed roller for feeding documents;
   a document separating member disposed for contact with said feed roller to ensure the feeding of documents inserted between said feed roller and said document separating member one at a time;
   a support member for supporting said document separating member;
   a pushing member attached to said support member for pushing said document separating member against said feed roller;
   a reading roller for further feeding separated documents;
   guide means for guiding documents from said feed roller and said separating member to said reading roller; and
   an image reading device for reading data from documents fed by said feeding roller;
   wherein said document separating member has a document contact surface with a downstream end defining a document feed plane; and
   wherein said guide means comprises a document guide surface on said pushing member located downstream of said document separating member, said document guide surface of said pushing member extending through a downstream extension of said document feed plane for deflecting documents fed by said feed roller from the direction of said document feed plane.

2. The image reading device of claim 1, wherein:
   an upstream document transport path between said feed roller and said document guide surface of said pushing member is inclined downwardly;
   a downstream document transport path downstream of said document guide surface is bent relative to the upstream document transport path so as to be located above an extension of the upstream document path if the document path extended straight beyond said document guide surface; and
   said downstream document transport path extends substantially straight.

3. The image reading device of claim 2, wherein:
   said pushing member is rotatably attached to said support member at a rotary fulcrum point; and
   said rotary fulcrum point of said pushing member is located on a bisector of the angle formed by said upstream document path and said downstream document path.

4. The image reading device of one of claim 2 and 3, wherein said guide means further comprises a further document guide surface concaved upward under said document guide surface of said pushing member.

5. The image reading device of claim 4, and further comprising:
   a hopper having a document transport surface defining a hopper feed plane for supplying documents to said feed roller, wherein said support member has a guide surface for guiding documents fed from said hopper and said support member is rotatably mounted at a rotary fulcrum point that is located approximately on an extension of said hopper feed plane.

6. The image reading device of one of claims 1 and 3, and further comprising:
   a hopper having a document transport surface defining a hopper feed plane for supplying documents to said feed roller, wherein said support member has a guide surface for guiding documents fed from said hopper and said support member is rotatably mounted at a rotary fulcrum point that is located approximately on an extension of said hopper feed plane.

7. A document feed arrangement for an image reading device, comprising:
   a feed roller for feeding documents;
   a document separating member disposed for contact with said feed roller to ensure the feeding of documents inserted between said feed roller and said document separating member one at a time;
   a support member for supporting said document separating member;
   a pushing member rotatably attached to said support member at a rotary fulcrum point for pushing said document separating member against said feed roller, said pushing member including a document guide surface located downstream of said document separating member; and
   a means for constituting a document transport path bent at said document guide surface of said pushing member, and comprising an upstream document transport path upstream of said document guide surface and a downstream transport path downstream of said document guide surface;
   wherein said rotary fulcrum point of said pushing member is located on a bisector of the angle between said upstream transport path and said downstream transport path.

8. An image reading device, comprising:
   a feed roller for feeding documents;
   a document separating member disposed for contact with said feed roller to ensure the feeding of documents inserted between said feed roller and said document separating member one at a time;
   a means for defining an upstream document transport path inclined downwardly from an downstream of said feed roller and said document separating member, said upstream path extending in a substantially straight manner;
   a means for defining a downstream document transport path downstream of and following said upstream transport path, said upstream and downstream transport paths being connected at an inflection point whereat said downstream document transport path is bent relative to said upstream document transport path so as to be located above an extension of said upstream document path if said upstream document path extended straight beyond said inflection point, said downstream document path extending in a substantially straight manner;

a reading device located along said downstream document transport path for reading data from documents transported by said downstream document transport path; and a document guide surface located below said inflection point, said document guide surface being concaved upwardly below said downstream document transport path.

9. A document feed arrangement for an image communication device, comprising:

a feed roller for feeding documents;

a document separating member disposed for contact with said feed roller to ensure the feeding of documents inserted between said feed roller and said document separating member one at a time;

a means for defining an upstream document transport path inclined downwardly from and downstream of said feed roller and said document separating member, said upstream path extending in a substantially straight manner;

a means for defining a downstream document transport path downstream of and following said upstream transport path, said upstream and downstream transport paths being connected at an inflection point whereat said downstream document transport path is bent relative to said upstream document transport path so as to be located above an extension of said upstream document path if said upstream document path extended straight beyond said inflection point, said downstream document path extending in a substantially straight manner; and a document guide surface located below said inflection point, said document guide surface being concaved upwardly below said downstream document transport path.

10. An image reading device, comprising:

a hopper having a document transport surface for receiving a stack of documents;

a feed roller for feeding documents from said hopper;

a document-separating member disposed for contact with said feed roller so as to ensure the feeding of documents inserted between said feed roller and said member one at a time;

a pushing member for pushing said document-separating member against said feed roller; and a support member which retains said pushing member and which has a guide surface for guiding the topside of each document fed from said hopper;

wherein said support member is rotatably mounted at a rotary fulcrum point located on an approximate extension of the document transport surface of said hopper.

11. An image communication device, comprising:

a feed roller for feeding documents;

a document separating member disposed for contact with said feed roller to ensure the feeding of documents inserted between said feed roller and said document separating member one at a time;

a support member for supporting said document separating member;

a pushing member attached to said support member for pushing said document separating member against said feed roller;

a reading roller for further feeding separated documents;

guide means for guiding documents from said feed roller and said separating member to said reading roller; and an image reading device for reading data from documents fed by said feeding roller;

wherein said document separating member has a document contact surface with a downstream end defining a document feed plane; and wherein said guide means comprises a document guide surface on said pushing member located downstream of said document separating member, said document guide surface of said pushing member extending through a downstream extension of said document feed plane for deflecting documents fed by said feed roller from the direction of said document feed plane.

12. The image communication device of claim 11, wherein:

an upstream document transport path between said feed roller and said document guide surface of said pushing member is inclined downwardly;

a downstream document transport path downstream of said document guide surface is bent relative to the upstream document transport path so as to be located above an extension of the upstream document path if the document path extended straight beyond said document guide surface;

said downstream document transport path extends substantially straight;

said pushing member is rotatably attached to said support member at a rotary fulcrum point; and said rotary fulcrum point of said pushing member is located on a bisector of the angle formed by said upstream document path and said downstream document path.

13. The image communication device of claim 12, wherein:

said guide means further comprises a further document guide surface concaved upward under said document guide surface of said pushing member.

14. The image communication device of one of claims 11-13, and further comprising:

a hopper having a document transport surface defining a hopper feed plane for supplying documents to said feed roller, wherein said support member has a guide surface for guiding documents fed from said hopper and said support member is rotatably mounted at a rotary fulcrum point that is located approximately on an extension of said hopper feed plane.

* * * * *